Patented June 26, 1934

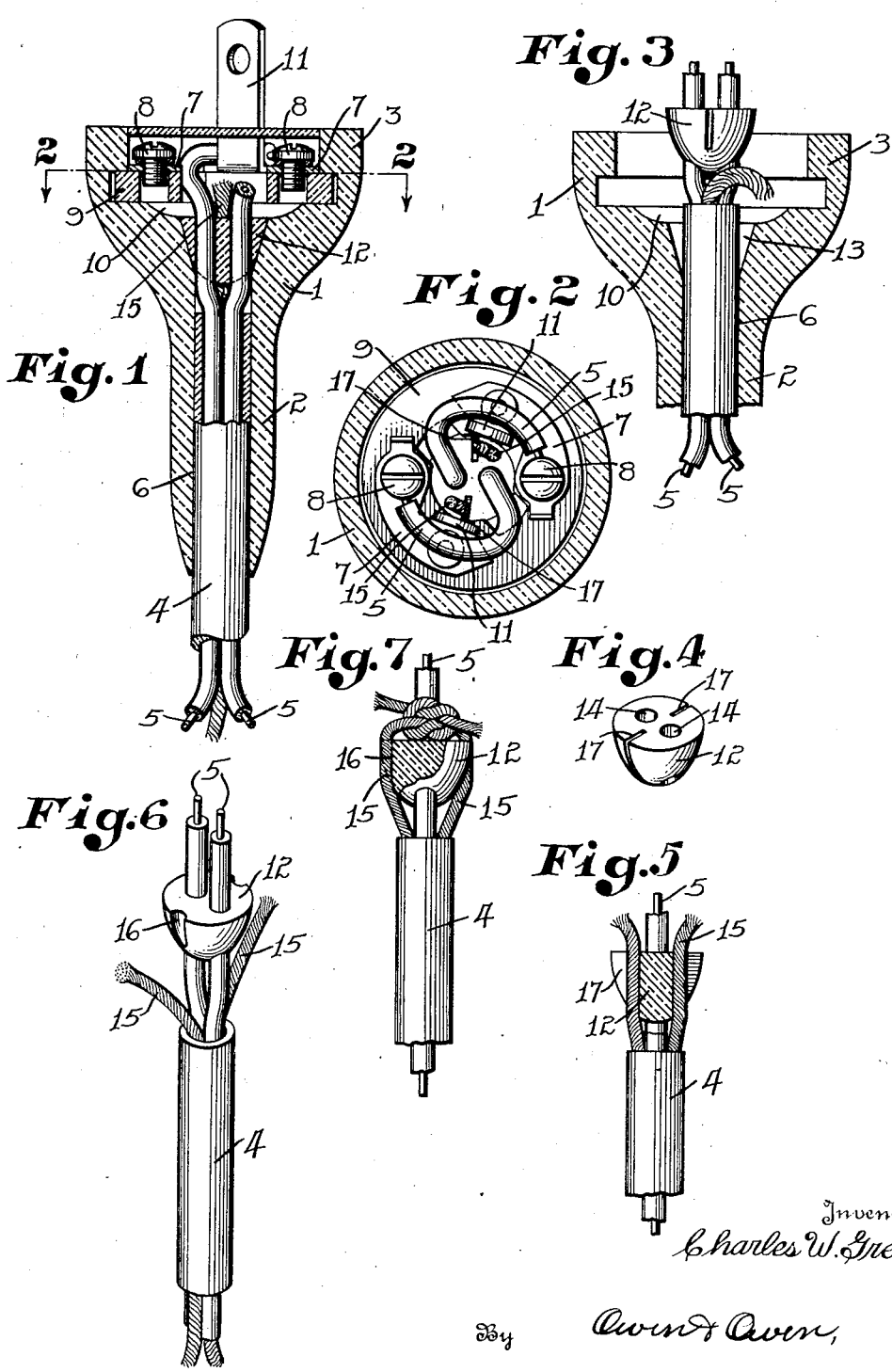

1,964,350

UNITED STATES PATENT OFFICE 1,964,350

ANCHORING MEANS FOR TERMINAL WIRES

Charles W. Greene, Toledo, Ohio, assignor to The De Vilbiss Company, Toledo, Ohio, a corporation of Ohio Application January 17, 1931, Serial No. 509,319

2 Claims. (Cl. 173—322)

This invention relates to electrical devices and particularly, to anchoring means for lead-in wires used in connection with electric line couplings or connecting means.

The object of the invention is the provision of simple, efficient and inexpensive means of the character described, which is adapted to firmly anchor lead-in wires in attaching or coupling members for the wires independently of the terminal binding screws customarily used for such purpose, so that any pull exerted on the wires will be transmitted to the attached member through other than the terminal screws, thereby reducing to a minimum the liability of pulling the wires from engagement with the screws.

The invention is fully described in the following specification, and while it is capable of being employed in numerous forms, one embodiment thereof in connection with a plug member of an electric coupling, is illustrated in the accompanying drawing, in which—

Fig. 1 is a central longitudinal section of the coupling member embodying the invention with wires attached and parts in full; Fig. 2 is a cross section on the line 2—2 of Fig. 1 with parts in full; Fig. 3 is a fragmentary view similar to Fig. 1 with parts removed and with the anchoring means out of anchoring position with respect to the body member; Fig. 4 is a perspective view of the anchoring member alone; Fig. 5 is a side elevation of a portion of the cable with the anchoring member in central vertical section and showing the anchoring cord members of the cable in engagement therewith; Fig. 6 is a perspective view of an armored cable having the armor stripped from the wires and enclosed filler cords at one end, and with the anchoring member embodying the invention mounted on the wires; Fig. 7 is an elevation of the parts shown in Fig. 6, with the filler cords tied over the anchoring member to assist in anchoring the cable thereto.

Referring to the drawing, 1 designates the body of the plug member of a coupling and includes, in the present instance, the sleeve or neck portion 2 and the enlarged end of head portion 3. The armored cable 4, which carries therein the circuit wires 5—5, with their individual coverings, is extended through the neck opening 6 of the coupling member, and the individual wires are clamped to respective terminal plates 7 by screws 8, as well understood in the art. The plates 7 are carried, in the present instance, by a disc 9 of insulating material and this disc is anchored in the hollow of socket portion 10 of the enlarged end 3 of the coupling member in any suitable manner. As the manner of mounting plate 9 in the coupling member forms no part of the present invention, it will not be described. It will be understood that each plate 7 has a coupling stud or member 11 projecting therefrom.

The inner end of the neck opening 6 of the body member 1 is preferably enlarged and tapered in form to receive a plug member 12, which is preferably gradually reduced from its outer end inwardly, for instance, in curved form as indicated in Fig. 3. This plug member is of yielding material, such as soft rubber, to adapt it to be compressed and reduced in cross-sectional size by being forced into the enlarged mouth portion 13 of the body member 1. The plug member is provided lengthwise therethrough with two spaced openings 14, 14 of a size to permit the covered wires 5 to be threaded therethrough, the openings 14 being preferably disposed on opposite sides of the plug axis and entirely separate from each other. The relative sizes of the covered lead-in wires and openings 14 are such that the walls of the openings will frictionally engage the covering of the wires so that a pull on the wires at the neck end of the body member will tend to draw the plug member into the tapered receiving socket 13 of the body member. It is also apparent, that if desired, the plug member may be forced into the socket 13 by pressure exerted through the socket 10 of the body member. The forcing of the soft rubber plug 12 into the receiving socket 13 causes the yielding material of the plug to grip tightly and individually around each of the lead-in wires so as to firmly anchor such wires in the plug against withdrawal therefrom.

Customarily, an armored cable 4 contains within its armored covering a fibrous filling in addition to the lead-in wires 5, and this filling may be utilized to form cords 15, which may be left intact when the armored covering is stripped from an end of the cable, and to extend up at opposite sides of the plug member 12 and be drawn into slots or notches 17 provided lengthwise in opposite sides of the plug member, as best shown in Figs. 4 and 5. The slots 17 are narrow so that the walls thereof have a gripping action on the cords, and this action is augmented by the compression of the plug material when the plug is forced into the socket 13, thereby providing a firm anchorage for the cable through the medium of the cords.

In Fig. 6 the cord-receiving notches in the opposite sides of the anchoring member 12, which notches are designated 16, are not as deep and narrow as the notches 17, so that the walls of such notches in themselves will not serve alone to hold the cords 15. However, when the member 12 is forced into the receiving socket of the body member 1, the compression of the material of the anchoring member causes a contraction of the notches 16, so that the walls and base of each of such notches cooperate with the wall of the socket 13 to firmly grip and hold the cord members 15 when the parts are assembled. If the cords 15 are of sufficient length, they may be tied together over the top of the member 12, as shown in Fig. 7. This, however, is not necessary, as the cords are securely anchored without such typing.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In combination in a device of the class described, a body member having a terminal carrying socket in one end with a wire introducing opening leading therefrom, a compressible wire anchoring plug adapted to seat in the inner end of said opening, said plug having provision for the passage of lead-in wires therethrough into said socket and having lengthwise notches preformed in opposite sides thereof, and a cable having wires extending through said plug into said socket and having a filler forming separate strings inserted into said notches and anchored therein by compression of the plug caused by forcing it into said opening.

2. In combination in a device of the class described, a body member having a terminal carrying socket in one end with a wire introducing opening leading therefrom and having a tapered inner end portion, a tapered wire anchoring plug of compressible material adapted to be removably seated in the tapered end of said opening, said plug having provision for the passage of lead-in wires therethrough into said socket and provided in its outer surface with a longitudinally extending notch having compressible side walls, and a cable having wires extending through said plug into said socket and having a filler forming a string inserted into said notch and gripped therein by compression of the plug and of the notch side walls caused by forcing the plug into said opening.

CHARLES W. GREENE.